Oct. 14, 1941.　　　　E. F. FISHER　　　　2,259,030
WET DUST COLLECTOR AND AIR WASHER
Filed Jan. 19, 1939
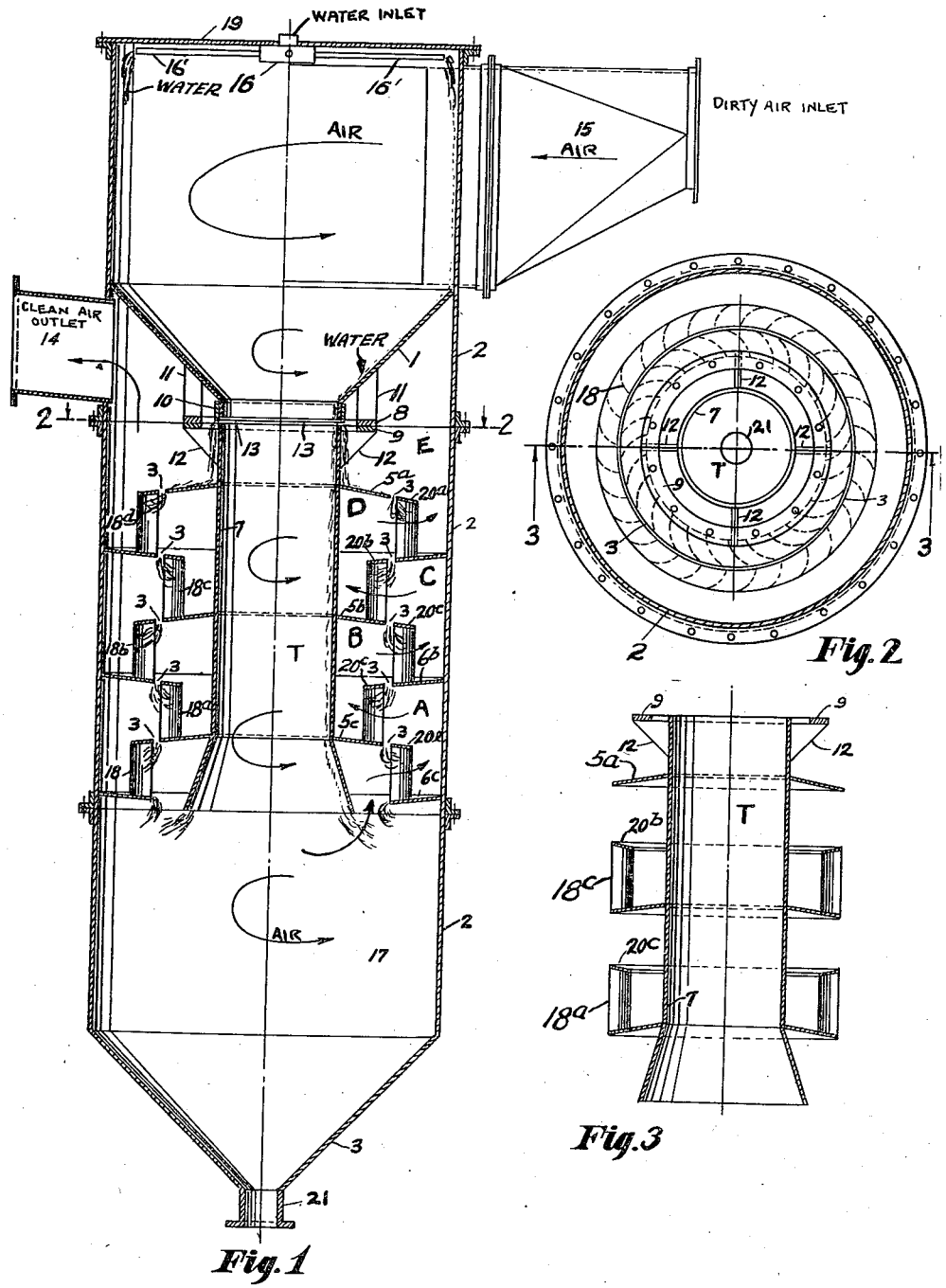
INVENTOR.
Ernest F. Fisher Patented Oct. 14, 1941

2,259,030

UNITED STATES PATENT OFFICE 2,259,030

WET DUST COLLECTOR AND AIR WASHER

Ernest F. Fisher, Boston, Mass.

Application January 19, 1939, Serial No. 251,751

3 Claims. (Cl. 261—21)

My invention relates to improvements in wet dust collectors and air washing units, wherein the cleaning effect is attained by subjecting dust or fume laden air to the continuous scrubbing action of water or other liquid which is set in violent agitation by the swirling air and caused to wet large surface areas upon which particles of dust are caused to impinge out of the air current during the course of the air travel through the unit, thus separating the dust particles from the air and leaving the air clean.

This invention consists in the novel features of construction more fully set forth in the specifications and pointed out in the claims.

The principal object of my invention is to provide more preliminary wetting of the dust particles carried by the incoming air as it enters the unit and before the dust laden air receives its final contact with the liquid.

Another object of my invention is to provide a new apparatus for introducing the washing liquid so that this liquid, after it does its preliminary washing of the entering air to relieve the air of the bulk of its load of dust and heavier material, may be used again to effect a final washing of the air to remove the extremely fine particles of dust.

Another object of my invention is to provide a system of guide and impingement vanes or surfaces of a unitary structure that is independent of coordinating baffles and blades and that can be withdrawn as a unit from the enclosing chamber without hindrance from the coordinating baffles or other structural elements of the housing.

A further object of my invention is to provide a system of guide vanes, impingement surfaces and baffles and enclosing walls that imposes the least resistance to the flow of dust laden air as it swirls in a continuous path without change of direction and to provide a structure that will facilitate fabrication and assembly, thus lowering the cost of this equipment to the purchaser.

Other advantages of my invention will be better apparent from a detailed description in connection with the accompanying drawing, in which: Figure 1 is a vertical cross section. Figure 2 is a horizontal cross section taken on the line 2—2 of Figure 1. Figure 3 is a vertical cross section only of the axial tube with its baffles and vanes taken on the line 3—3 of Figure 2. This is the assembly T shown in place in Figure 1 in cooperative relation with the baffles and vanes of housing 2.

Referring again to the drawing, my improved dust collector and air washer comprises a vertical circular chamber 2 with a cover 19, a tangential inlet 15 for delivering dust laden air to the unit and a water distributing means 16 and 16¹. The circular chamber 2 is separated near the top just under the tangential inlet 15 from the rest of the chamber below by means of the conical hopper, as collector 1, from which is suspended the axial tube assembly T by means of brackets 11 and 12 and the companion flanges 8 and 9, leaving the top of the axial tube T and the bottom opening of hopper, or collector, 1 spaced apart at 13 to permit water that flows down the hopper, or collector, 1 to flow therethrough and fall upon the uppermost sloping baffle 5ᵃ which is a part of the axial tube assembly T. The water then falls off the edge of this baffle through the concentric clearance 3 between baffle 5ᵃ and blade ring 20ᵃ and so on downward through the various clearances 3 therebelow as hereinafter described.

The space 13 between axial tube T and the bottom outlet of hopper, or collector, 1 can be made wider or narrower by means of the band 10 which is moved up or down thereby increasing or decreasing the space 13 and thus regulating the flow of water therethrough and permitting the balance to continue down the axial tube T. The water flows through the slot 13 readily because of a negative pressure that will exist in the space surrounding the axial tube.

In the operation of my unit, dust or fume laden air enters the tangential inlet 15. This swirling air meets the water falling from pipes 16¹ and swirls it violently outward by centrifugal force against the wall 2 and against which the heavier dust particles impinge. This dust is washed downward with the swirling air through the axial tube T to the swirl or expansion chamber 17 and collects in the hopper, or collector, 3 as sludge and is discharged through the opening 21, along with the fine dust that is washed down from the bladed sections above.

The swirling air in chamber 17 throws the water falling from edge of baffle 6ᶜ and from the axial tube T outwardly by centrifugal force to the wall 2 thereby keeping the wall continuously wet. The swirling air continues upward and is guided by the curved blades 18 surrounding the axial tube T into the annular space A, surrounding the bladed sections 18 and 18ᵃ. As the air swirls through the blades 18, the water falling through the annular space 3 between blade ring 20ᶜ and baffle ring 5ᶜ, is carried through the blading 18 and copiously wets their surfaces and the adjacent wall 2. This water then falls on baffle ring 6ᶜ. Fine dust continues to impinge on these wetted surfaces and is washed down into hopper 3.

The swirling, spiraling air in annular space A is guided by the curved blades 18ª into annular space B surrounding the axial tube T. The water falling from edge of baffle 6ᵇ is carried through the blading 18ª copiously wetting their surfaces and the outer wall 7 of axial tube T. As the air continues to swirl in chamber B it is directed by the curved blades 18ᵇ into chamber C carrying through the blading 18ᵇ the water that falls from edge of baffle 5ᵇ and copiously wetting the surface of the blades and adjacent wall 2 upon which more fine dust impinges. The air continues spiraling upward without change of direction, through the successive rows of blading 18ᶜ and 18ᵈ until it reaches annular space E freed from dust and is discharged at clean air outlet 14.

This apparatus is an improvement on the device shown in my co-pending application, Serial No. 222,906, filed August 3, 1938.

What I desire to claim in the present application is:

1. A gas-cleaning apparatus comprising in combination a casing provided at the top with a tangential inlet, a collector below said inlet which creates an upper and lower compartment, an outlet provided in said casing below said collector, a vertical tube depending from said collector, a substantially horizontal ring-shaped baffle surrounding and attached to said tube, another substantially horizontal ring baffle attached to the inner wall of said casing below said outlet in staggered relationship to said first mentioned baffle, circularly disposed vertical swirl-producing vanes extending between said baffles and supported by one of said baffles, a blade ring attached to the free ends of said vanes, means to supply liquid within the casing and above said collector, and an opening provided in the wall of said tube to allow said liquid to drain over the outer surface of said tube, thence downwardly and over the surfaces of the attached baffle and said vanes.

2. A gas-cleaning apparatus comprising in combination a casing provided at the top with a tangential inlet, a collector below said inlet which creates an upper and lower compartment, an outlet below said collector, a vertical tube open at both ends supported in spaced relationship to said collector, superposed substantially horizontal ring-shaped baffles surrounding and attached to said tube, superposed substantially horizontal ring-shaped baffles attached to the inner wall of said casing below said outlet in staggered spaced relationship to said first-mentioned baffles, circularly disposed vertical swirl-producing vanes extending between each pair of oppositely staggered baffles and supported upon all but the topmost of said baffles, means for supplying liquid at the top of said casing so that portions of said liquid will flow through said space between said tube and said collector over the outer surface of said tube and down between said spaced vanes, baffles and plates.

3. Apparatus as in claim 2 in which said swirl-producing vanes are arranged so that each set produces rotational movement opposite in direction to that of the adjacent set.

ERNEST F. FISHER.